Dec. 19, 1939.	D. V. ACKERMAN	2,183,950
ADJUSTABLE SLIP CAM
Filed May 10, 1935

Inventor
David V. Ackerman

Attorney.

Patented Dec. 19, 1939

2,183,950

UNITED STATES PATENT OFFICE 2,183,950

ADJUSTABLE SLIP CAM

David V. Ackerman, Seattle, Wash.

Application May 10, 1935, Serial No. 20,740

1 Claim. (Cl. 74—568)

This invention relates to improvements in mechanical movements of the slip cam type; and some of its objects are to provide a slip cam mechanism wherein a load lifting cam will slip after having lifted the load, and wherein the lift and slip may be easily and simply regulated.

I accomplish these and other objects by providing a mechanism in which a cam, preferably circular, is driven by a shaft on which it can slip radially to eccentric positions. The load exerts a force on the cam at one side, the line of the load force being substantially radial of the cam. A slip limiting shoe is adjustable substantially radially to and from the cam at the opposite side. In operation, each time the cam rotates to the position in which the line of slip approaches the line of load force, the cam slips radially on its shaft to an eccentric position opposite to the point of load application. In the succeeding half revolution the cam eccentricity is brought to a position under the point of load application, when the cam again slips to a position of opposite eccentricity. The load is thus repeatedly lifted and suddenly dropped.

A more full understanding of the invention, its objects and accomplishments, will be had from the following detailed specification and accompanying drawing of an embodiment. In the drawing.

Figure 1:
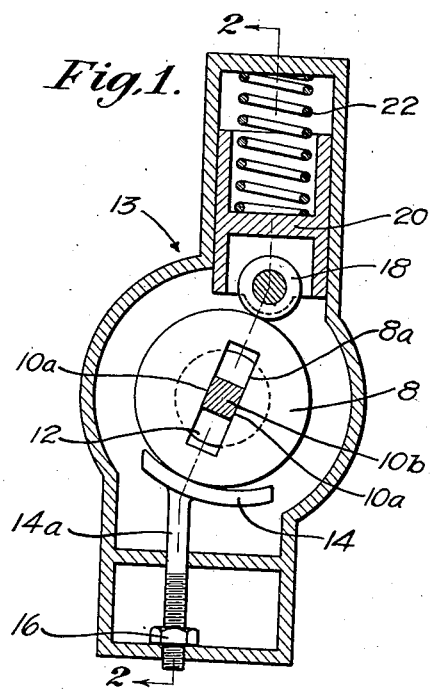
Fig. 1 is a sectional elevation of a mechanism embodying the invention.
Figure 2:
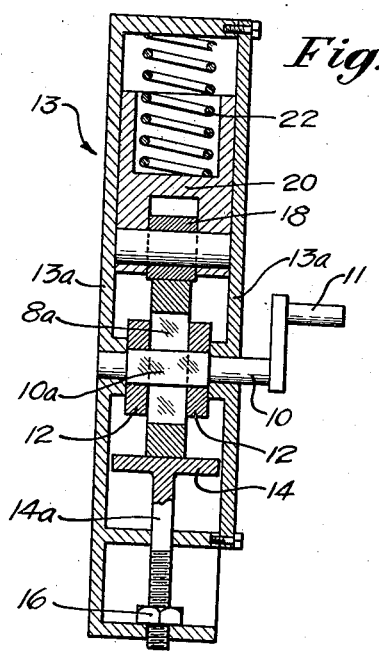
Fig. 2 is a section on line 2—2 of Fig. 1.

In the drawing, the cam 8 is mounted on drive shaft 10 which has, by way of illustration, a driving crank 11. The cam has a radial slot 8a extending to both sides of its center; and the sides of this slot engage the flat faces 10a of a flat or square portion 10b of shaft 10, so that the cam may be driven by the shaft and at the same time may slip radially along the line of the slot. The cam is confined axially between two guide collars 12 which are in turn confined between the side walls 13a of a casing 13.

The load as here shown is the force exerted by a compression spring 22, which presses a slide 20 and a cam contact roller 18 toward the cam. The load as here shown moves vertically on a line somewhat offset from a radial line through the cam; but, as will be readily understood, the load force exerted on the cam by the roller is substantially radial of the cam.

At the side of the cam opposite the load application point is a regulating shoe 14, here shown as supported on a screw-threaded stem 14a so that adjustment of nut 16 will adjust the position of shoe 14 under the cam. The shoe is adjustable from the highest position of Fig. 1, to the lowest operating position of Figs. 3 and 4.

Figure 3:
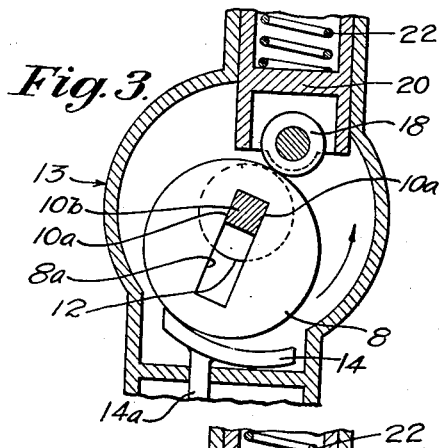
Figs. 3, 4 and 5 are fragmentary views similar to Fig. 1 but showing the cam and regulating shoe in different operating positions.
Figure 4:
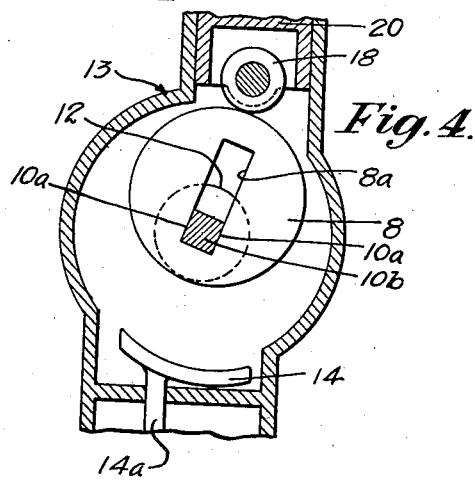

In Fig. 1, with shoe 14 in its highest position, the cam is held in a position concentric with the shaft, and rotation of the shaft and cam will not then lift the load. If shoe 14 is lowered to the position of Figs. 3 and 4, the cam will, under the load force, take a position of maximum eccentricity such as shown in Fig. 3, its eccentric center being then below the shaft. On rotation, as indicated by the arrow in Fig. 3, the cam will rotate around toward the position of Fig. 4, keeping its eccentricity until reaching or approaching that position approximately 180° removed from the position of Fig. 3. When the line of cam slip (the length axis of the cam slot 8a) approaches the line of force of the load (a position at or approaching that of Fig. 4) the cam suddenly slips diametrically to such a position as shown in Fig. 3. In so slipping it suddenly lowers the load to the position of Fig. 3. Each succeeding half revolution of the cam repeats the operation of lifting the load and letting it drop.

The exact position of the cam when it slips (angular position of the cam with reference to the line of load force) depends, among other things, on the friction that opposes the sliding of the cam on the shaft. If the friction between the two is relatively large the cam will reach substantially the position of Fig. 4 before slipping; if relatively small, the cam will slip in a position further angularly removed from that of Fig. 4. But, as will be readily understood, the cam cannot slip until the axis of its slot 8a has passed beyond a position at right angles to the line of the load force, and consequently the cam must always lift the load and the subsequent cam-slip must always lower the load.

Figure 5:
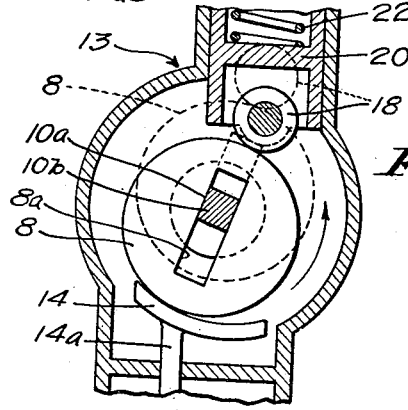

The distance the cam may slip is regulatable by adjustment of shoe 14. Fig. 3 shows the shoe adjusted to allow the cam its maximum slip; a linear distance equal to the length of slot 8a minus the thickness of shaft part 10b. If the shoe be raised, as shown in Fig. 5, the cam is limited to a correspondingly lesser eccentricity and slip. For instance, in Fig. 5 the shoe is raised to a position about midway the positions of Fig. 3 and Fig. 1. Consequently the cam takes a position about half the eccentricity of Fig. 3, such as shown in full lines in Fig. 5. From this full line position it rotates around toward the dotted line position and, when reaching or approaching that position, slips to such a position as shown in full lines. The action is the same as before described except that both the lift of the load and the slip are less.

Having thus described my invention, what I claim is:

A mechanical movement consisting of a support, a member reciprocatory in said support, a circular disc having its periphery in engagement with said member and containing a diametrical slot, a rotary driving shaft in said support and having an intermediate portion of square cross section in said disc slot, guide members secured to said shaft at each side of said disc and means for shifting said disc transversely of the shaft consisting of a shoe in sliding contact with said disc periphery and means carried by said support for adjusting said shoe relative to said shaft.

DAVID V. ACKERMAN.